US006674614B2

(12) United States Patent
Bonin et al.

(10) Patent No.: US 6,674,614 B2
(45) Date of Patent: Jan. 6, 2004

(54) METHOD OF FABRICATING ELECTRICALLY ISOLATED METAL MEMS BEAMS AND MICROACTUATOR INCORPORATING THE MEMS BEAM

(75) Inventors: Wayne A. Bonin, North Oaks, MN (US); Lee Walter, Plymouth, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 94 days.

(21) Appl. No.: 10/037,679

(22) Filed: Jan. 2, 2002

(65) Prior Publication Data
US 2002/0097530 A1 Jul. 25, 2002

Related U.S. Application Data
(60) Provisional application No. 60/263,671, filed on Jan. 23, 2001.

(51) Int. Cl.[7] .............................. G11B 21/24; G11B 5/56
(52) U.S. Cl. .................................................. 360/294.5
(58) Field of Search ............................ 360/294.5, 294.6

(56) References Cited
U.S. PATENT DOCUMENTS 5,399,415 A   3/1995   Chen et al. ................. 428/209
6,198,606 B1  3/2001   Boutaghou et al. ........ 360/294.3
6,239,952 B1  5/2001   Bonin ........................ 360/294.4
6,414,823 B1 * 7/2002  Crane et al. ............... 360/294.5
6,483,671 B2 * 11/2002 Vigna et al. ............... 360/294.5

OTHER PUBLICATIONS

"Micro–Actuator For Tera–Storage," by T. Hirano et al., IBM Corp., Research Division, Almaden Research Center, 6 pages (published prior to 2001).

* cited by examiner

Primary Examiner—Robert S. Tupper
(74) Attorney, Agent, or Firm—Westman, Champlin & Kelly, P.A.

(57) ABSTRACT

A microactuator is formed by defining stator and rotor regions on a wafer. Isolation barriers are formed in the stator and rotor regions to define a isolation regions. Conductive suspension beam are formed between the first and second isolation regions, and wafer material between the stator and rotor regions is removed to form a stator and a rotor. The microactuator is arranged to position a load device having an electrical component. The suspension beams support the rotor and load device and provide electrical connection between the stator and rotor for the microactuator and/or the load device.

29 Claims, 11 Drawing Sheets

METHOD OF FABRICATING ELECTRICALLY ISOLATED METAL MEMS BEAMS AND MICROACTUATOR INCORPORATING THE MEMS BEAM

CROSS-REFERENCE TO RELATED APPLICATION

This application claims priority of U.S. Provisional Application No. 60/263,671 filed Jan. 23, 2001 for "Electrically Isolated, Mechanically Anchored Metal MEMS Beams", the disclosure of which is incorporated herein by reference.

FIELD OF THE INVENTION

This invention is directed to a microelectromechanical structure (MEMS), and particularly to an electrically isolated, mechanically anchored metal MEMS beam for use in a microactuator, such as a microactuator for fine positioning a slider relative to a disc in a disc drive.

BACKGROUND OF THE INVENTION

Microactuators are employed in a wide variety of applications for controlling the motion of microstructures, including switches, variable impedances, etc., as well as for positioning microstructures such as head/slider structures relative to a selected track on a disc in a disc drive. For example, as track density becomes increasingly greater in disc drives, the track width and spacing becomes increasingly smaller, necessitating more accurate control of the micro positioning of the slider to the tracks. The slider is supported by an actuator arm that is controlled by a voice coil motor to coarsely position the slider relative to a track. The microactuator is carried on the arm to finely position the slider relative to the track.

A typical microactuator in a disc drive employs a stator and a rotor, with the slider mounted to the rotor. The slider, which carries the transducing head, is typically aerodynamically designed to "fly" a small distance above the surface of the confronting disc. The stator is supported by the actuator arm and is usually preloaded by a load beam that contributes to the control of the fly height of the slider.

Where the microactuator provides a linear motion to the rotor, suspension beams between the stator and rotor may be nearly as long as the entire microactuator. The long length to the suspension beams usually allows the beams to be correspondingly wide, yet still retain the required flex characteristics to permit movement between the stator and rotor. The width of the suspension beams in linear microactuators is usually great enough to permit formation of a metal conductor in a trench in the beam for connection to the rotor and the head. However, rotary microactuators employ suspension beams that are splayed out in a pattern similar to spokes on a wheel. Consequently, the beams are shorter than suspension beams in linear microactuators, requiring the beams to also be more narrow to retain the required flex characteristics. For example, the width of a suspension beam in a rotary microactuator is often less than about 10 microns ($\mu$m). As a result, it is not practical to form a trench in the beam for support of the beam. While this feature would seemingly dictate use of linear microactuators, rotary microactuators have the desirable feature of rejection of the voice coil motor acceleration.

To operate the head it is necessary to provide electrical connections between the stator and the rotor. In most disc drives, a flex circuit consisting of flexible conductive wires, is supported by the actuator arm and is connected to conductive pads on the stator and on the rotor and slider to operate the microactuator and supply write signals to, and read signals from, the head. However, the small rigidity of the flex circuit connection to the rotor and slider adversely affects operation of the microactuator. The present invention provides a solution to this and other problems, and offers other advantages over the prior art.

SUMMARY OF THE INVENTION

The present invention is directed to a metal suspension beam for a microactuator that provides electrical connection between the stator and rotor of the microactuator, that is electrically isolated from the stator and rotor and that provides mechanical support for the rotor and its load. As used herein, "stator" refers to the portion of the microactuator that is primarily supported by a structure external to the microactuator. Hence, the stator may be rigidly mounted to the actuator arm of a disc drive and is movable with that arm. "Rotor" refers to the portion of the microactuator that is primarily supported by the stator and is movable relative to the stator. The term "rotor" is intended to be broadly construed, and should not be construed as limited to a particular type of motion. Hence, the rotor may move in a linear, rotary, or tortuous motion relative to the stator.

In one embodiment, a suspension beam is formed between a stator and a rotor of a microactuator. The stator and rotor regions are defined on a wafer, and isolation barriers are formed through the wafer in the stator and rotor regions. The isolation barriers define respective isolation regions in the respective stator and rotor regions. A conductive suspension beam is formed through the wafer between the first and second isolation regions. The wafer material between the stator and rotor regions is removed to form the stator and rotor.

In some embodiments, the isolation barriers are formed by forming isolation trenches through the wafer in the stator and rotor regions, and filling the first and second isolation trenches with insulation material. In other embodiments, the suspension beam is formed by forming a beam trench through the wafer between two isolation regions, and filling the beam trench with conductive material.

In other embodiments, conductive patterns are printed on a surface of the wafer material of the stator and rotor coupled to the suspension beam in the respective isolation regions.

In one embodiment, a microactuator includes a stator, a rotor supporting a load device, such as a slider, and suspension means is coupled to the stator and rotor to support the rotor and load device and provide electrical connection between the stator and rotor. In preferred embodiments, the suspension means comprises a metal beam, isolation regions on the stator and rotor supporting respective ends of the metal beam, insulation layers on the stator and rotor outside the isolation regions, and conductive traces supported on the insulation layers and coupled to the end of the metal beam in the respective isolation region.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
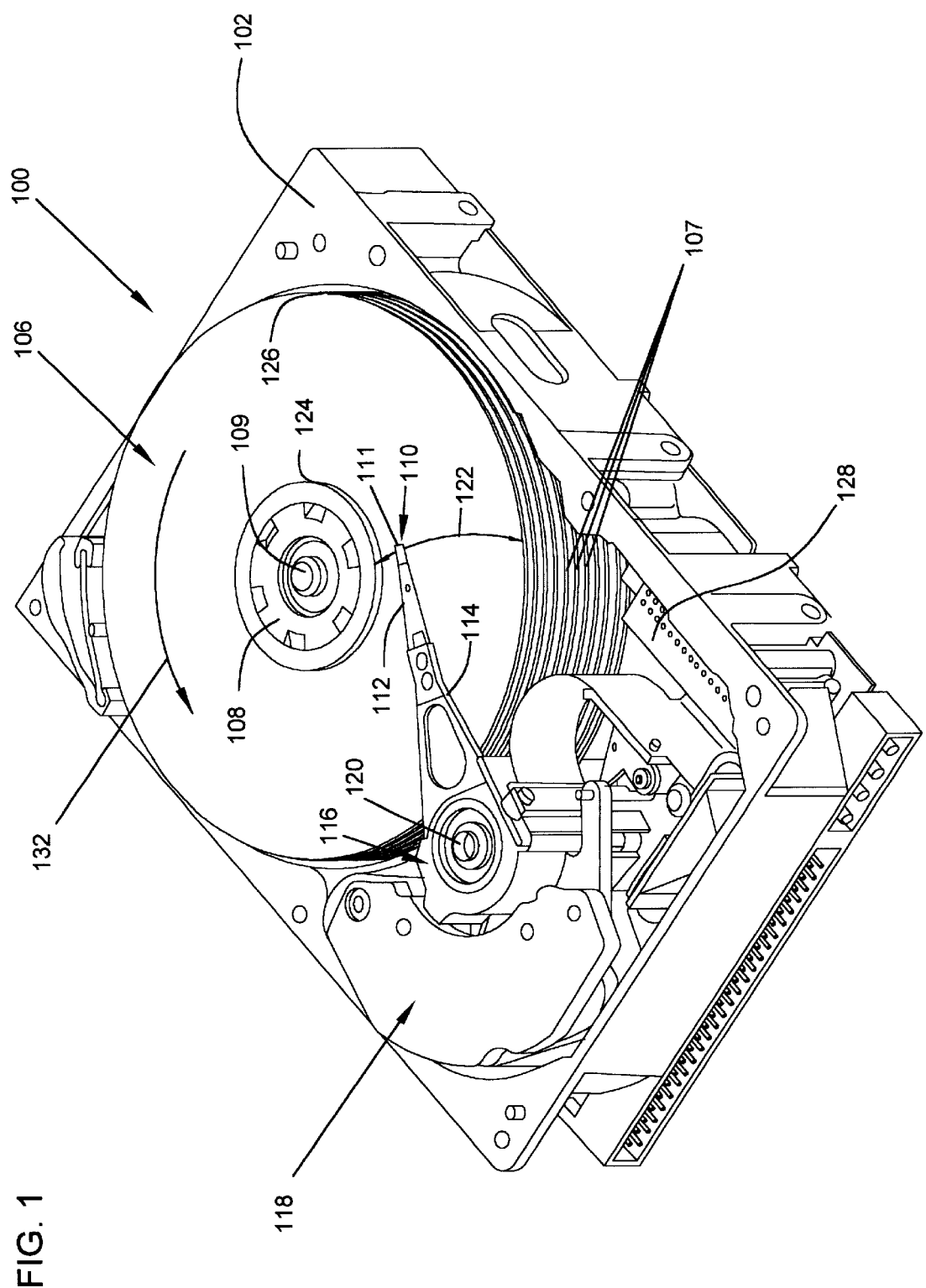
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc of disc pack 106, and carries a transducing head 111 arranged to write data to, and read data from, concentric tracks on the confronting disc surface. In the example shown in FIG. 1, sliders 110 are supported by suspensions 112 which are in turn attached to track accessing arms 114 of an actuator 116. Actuator 116 is driven by a voice coil motor (VCM) 118 to rotate the actuator, and its attached sliders 110, about a pivot shaft 120. Rotation of actuator 116 moves the heads along an arcuate path 122 to position the heads over a desired data track between a disc inner diameter 124 and a disc outer diameter 126.

Voice coil motor 118 is operated by position signals from servo electronics included on circuit board 128, which in turn are based on error signals generated by heads 111 and position signals from a host computer (not shown). Read and write electronics are also included on circuit board 128 to supply signals to the host computer based on data read from disc pack 106 by the read portions of heads 111, and to supply write signals to the write portions of heads 111 to write data to the discs.

Figure 2:
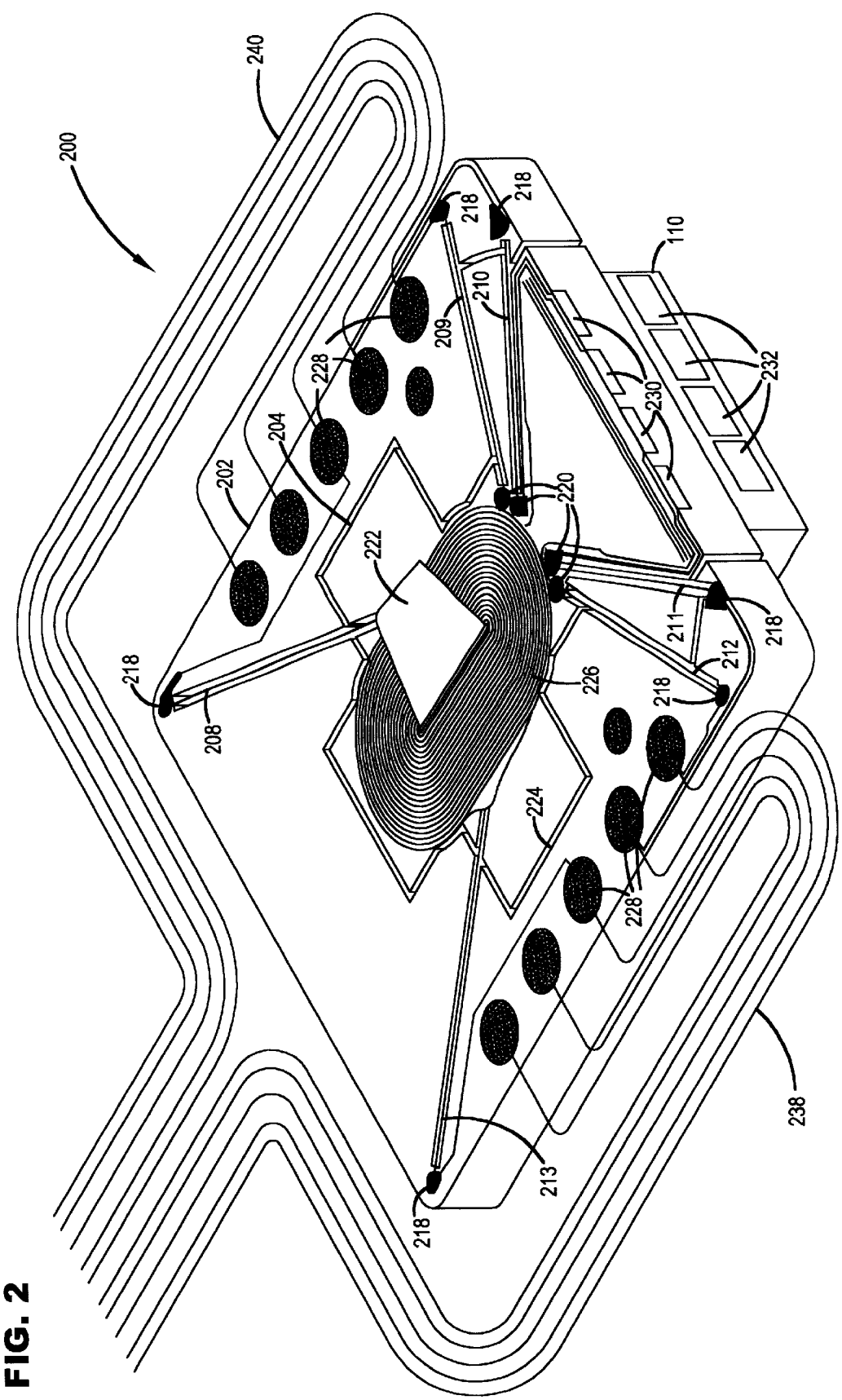
FIG. 2 is a perspective view of a microactuator and slider employed in the disc drive of FIG. 1 having suspension beams according to a presently preferred embodiment of the present invention.

FIG. 2 illustrates an exemplary microactuator 200 supporting slider 110. Microactuator 200 includes a stator 202 and a rotor 204, with the rotor supporting slider 110. Suspension beams 208–213 are rigidly attached at a first end 218 to stator 202. The opposite ends 220 of suspension beams 208–213 are rigidly attached to rotor 204 to support the rotor and slider. More particularly, ends 220 of suspension beams 209–212 are connected directly to rotor 204, whereas suspension beams 208 and 213 are coupled to conductor plates 222 and 224 at opposite ends of coil 226 mounted to rotor 204. Permanent magnets (not shown) are adjacent coil 226 to complete the motor of microactuator 200. U.S. Pat. No. 6,198,606, granted Mar. 6, 2001 to Boutaghou et al. and assigned to the same assignee as the present invention, describes one example of a microactuator employing a coil and permanent magnet.

Conductive pads 228 are formed on a surface of stator 202 and are electrically coupled to respective ends 218 of each support beam 208–213 by printed circuit traces 215. Pads 228 and traces 215 are formed by printed circuit techniques well known in the art. The ends 220 of support beams 209–212 are electrically coupled to pads 230 by printed circuit traces 217 on rotor 204. Pads 230 electrically coupled to pads 232 on slider 110 by wires 219 for connection to the read and write transducers of head 111 (FIG. 1). Flex cables 238 and 240 includes leads coupled to pads 228 (FIG. 2) on stator 202 to electrically couple the read and write transducers of head 111, and to electrically couple coil 226, to external circuits, such as to circuit board 128.

Microactuator 200 operates by applying position control signals through respective pads 228 and suspension beams 208 and 213 to opposite ends of coil 226. Electric current flowing through the coil, under the influence of the permanent magnet, operates to move rotor 204 relative to stator 202. The direction and magnitude of movement of rotor 204 relative to stator 202 is dependent on the direction and magnitude of the current in coil 234. Slider 110 is coarsely positioned by operating voice coil motor 118 (FIG. 1) to rotate actuator arm 114, load beam 112 and the entire structure of FIG. 2 along arc 122 about axis 120. Fine positioning of slider 110 is accomplished by application of current to coil 234.

Suspension beams 208–213 are positioned in channels between the stator 202 and rotor 204. Therefore, the only support for rotor 204 and slider 110 carried by rotor 204 are suspension beams 208–213. Moreover, during normal operation of the disc drive, the flying characteristics of slider 110 are governed by the wind created by the rotating disc, which is countered by the weight of the slider and rotor and the load force created by load beam 112 through button 234. Hence, the force transmitted between stator 202 and rotor 204 is supported by suspension beams 208–213.

One embodiment of the present invention is directed to a technique for fabricating suspension beams 208–213 to carrying electrical signals between the stator and the rotor, electrically isolated from the stator and rotor, and to provide adequate support for the load forces between the stator and rotor.

Figure 3:
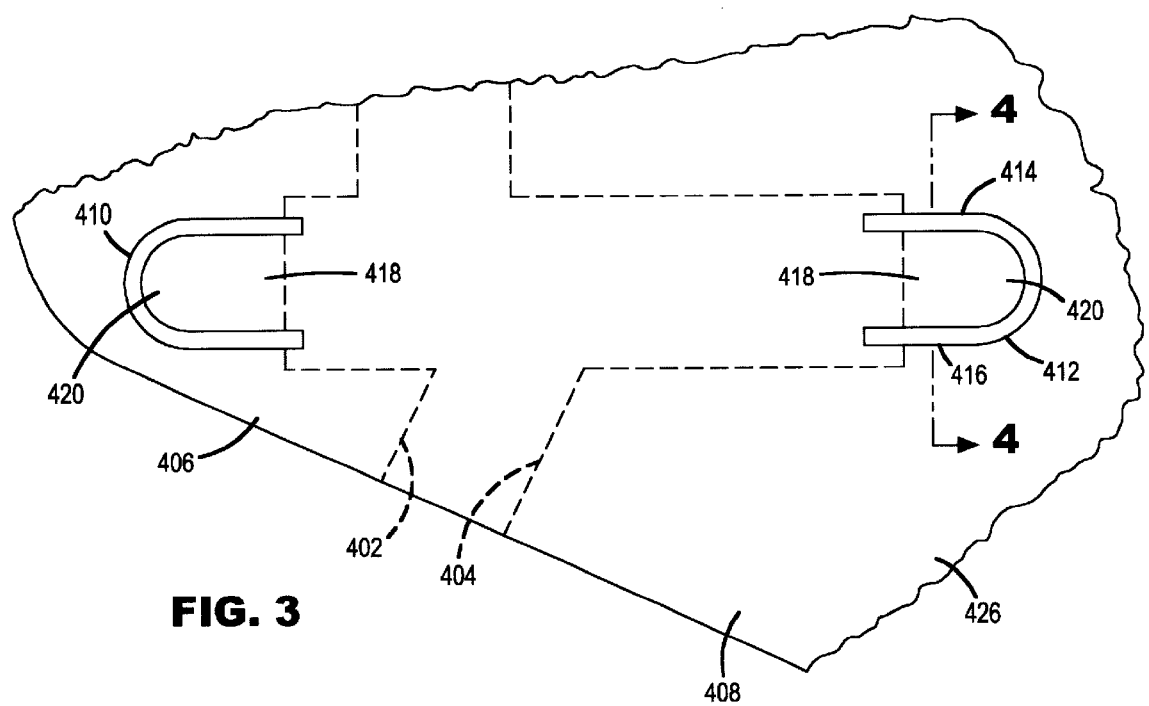
FIGS. 3–14 illustrate a process of forming a suspension beam according to a first embodiment of the present invention.
Figure 4:
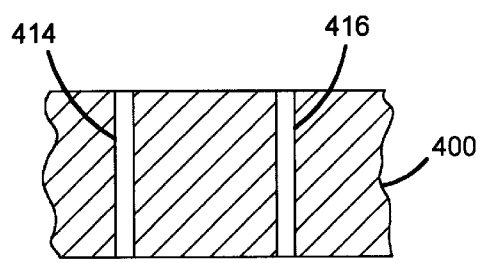

FIGS. 3–14 illustrate a first embodiment of the process for fabricating suspension beams 208–213. Wafer 400 is shown divided by dashed lines 402 and 404 into two regions: a stator region 406 and a rotor region 408. Wafer 400 is a silicon-based wafer having a thickness of approximately 200 µm. The wafer 400 is adequately thick to support slider 110 and the load forces imposed on microactuator 200. As shown in FIGS. 3 and 4, isolation trenches 410 and 412 are formed, such as by etching, through wafer 400. Isolation trenches 410 and 412 are preferably C-shaped and include legs 414 and 416 defining an opening 418 to an isolation region 420. Openings 418 of each pair of isolation trenches 410 and 412 preferably confront each other across the interface between the stator region 406 and rotor region 408.

Figure 5:
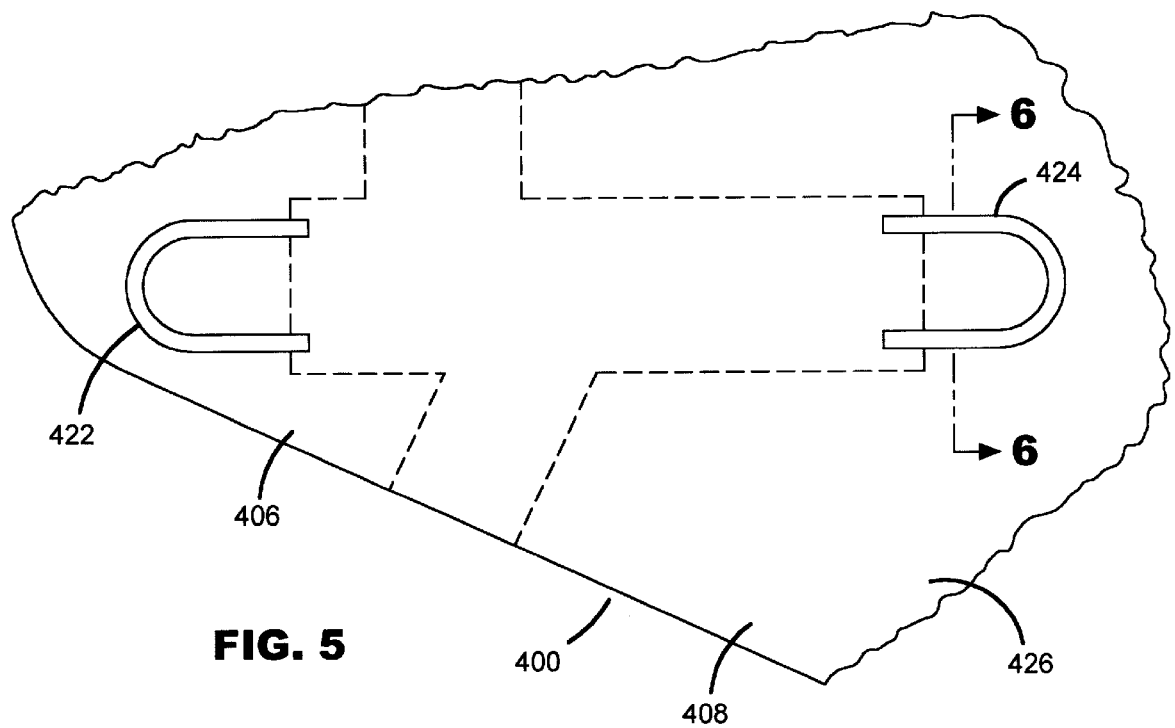
Figure 6:
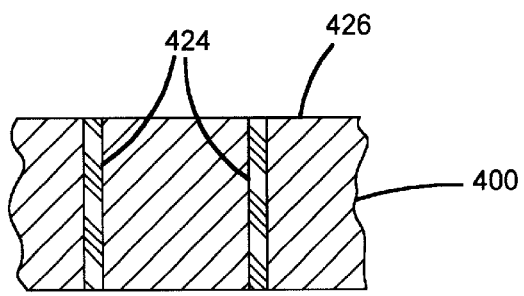

As shown in FIGS. 5 and 6, isolation trenches 410 and 412 are filled or partially filed with an insulating material, such as silicon nitride ($Si_3N_4$) or other slightly silicon-rich version of $SiN_x$ having a low stress. Other silicon-based dielectrics, such as silicon dioxide ($SiO_2$) may also be used. In any case, the insulating material is chosen based on its high dielectric characteristics and mechanical strength. The insulation material is deposited into the narrow isolation trenches 410 and 412 by a suitable low-pressure chemical vapor deposition or plasma-enhanced chemical vapor deposition process. Typically, the deposition process also deposits insulation material on the entire exposed surface 426 of wafer 400. If isolation trenches 410 and 412 are not completely filled with insulating material, the remainder of the space may be filled with polysilicon. In one embodiment of the invention, the layer of deposited insulation material on surface 426 is removed by etching and/or lapping, resulting in the structure shown in FIGS. 5 and 6. In another embodiment explained in connection with FIGS. 15–20, the insulation is allowed to remain in place for purposes to be explained.

Figure 7:
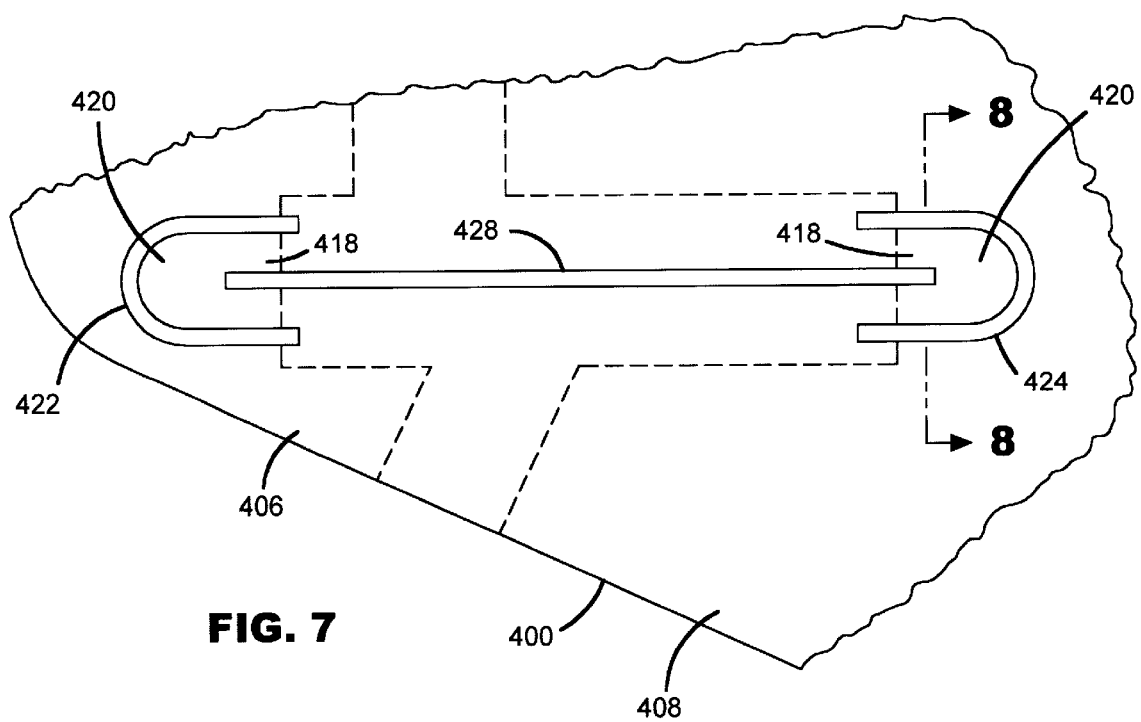
Figure 8:
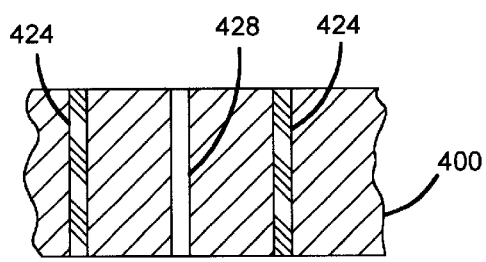

As shown in FIGS. 7 and 8, a beam trench 428 is formed through wafer 400 and arranged to extend into regions 406 and 408 inside isolation region 420 of each isolation barrier 422 and 424. A mask (not shown) is formed on surface 426 of wafer 400 and patterned to expose the shape of beam trench 428. Wafer material is then etched from the exposed portions of the wafer through the mask to form the trench. Trench 428 will have a depth equal to the thickness of wafer 400, namely about 200 μm, and a width between about 5 and 10 μm. The length of a trench 428 will depend on the length of the beam being constructed. As shown in FIG. 2, the length of the beam may differ, depending on the suspension being formed. As shown in FIG. 7, beam trench 428 extends into isolation regions 420 through the openings 418.

Figure 9:
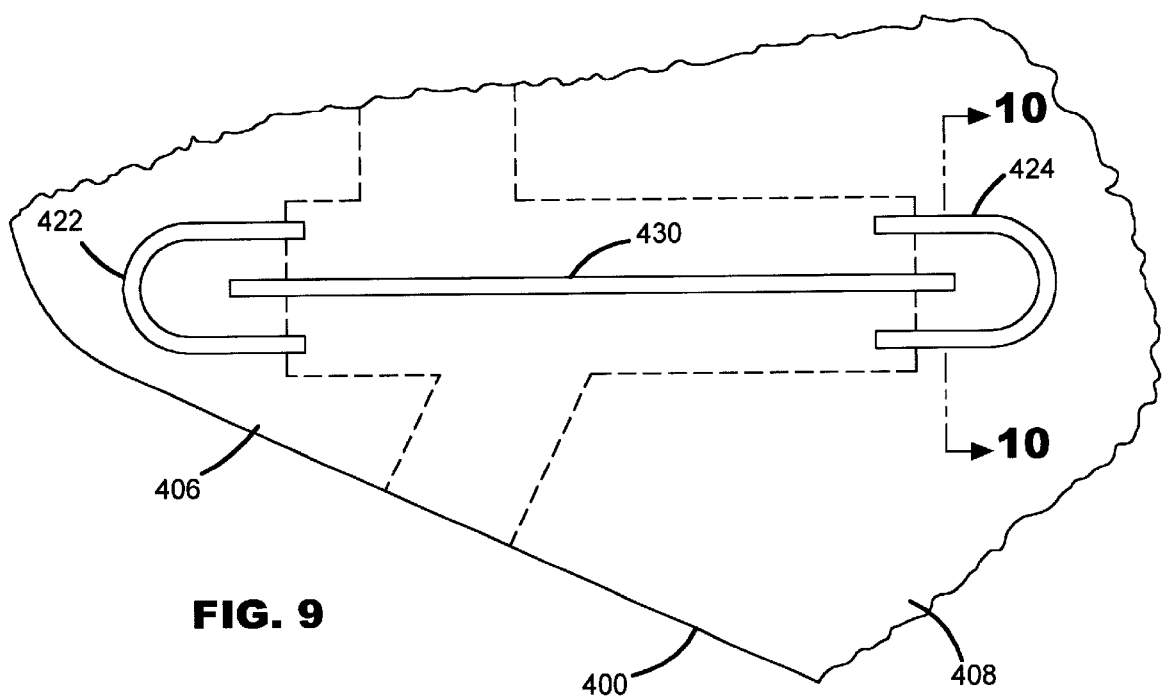
Figure 10:
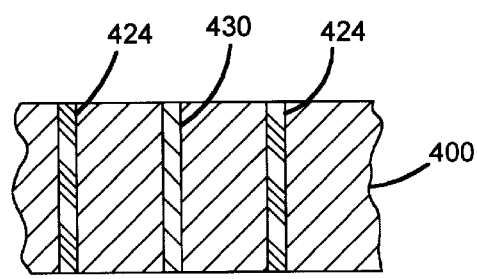

At FIGS. 9 and 10, beam trench 428 is filled with a metal by a low pressure chemical vapor deposition (LPCVD) or plasma-enhanced chemical vapor deposition (PECVD) process to form metal beams 430. The preferred materials for the metal fill include tungsten, molybdenum, titanium, tantalum, copper, aluminum and alloys thereof. Although pure copper and pure aluminum are relatively soft, and therefore of limited use for mechanical support elements, an aluminum-copper alloy consisting of approximately 95% aluminum and 5% copper is quite suitable since it demonstrates mechanical strength that is adequate for most purposes contemplated herein. The wafer surface is also coated with metal during the fill process. The excess metal of the wafer surface is removed by chemical etching or mechanical polishing, resulting in the structure of FIGS. 9 and 10.

Figure 11:
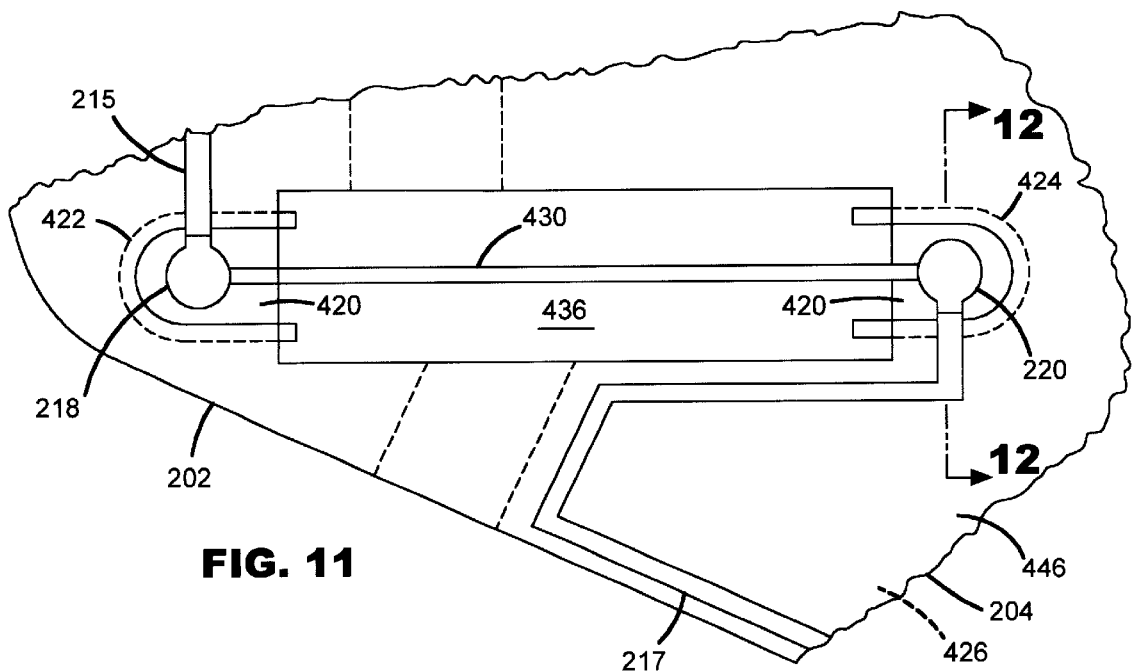
Figure 12:
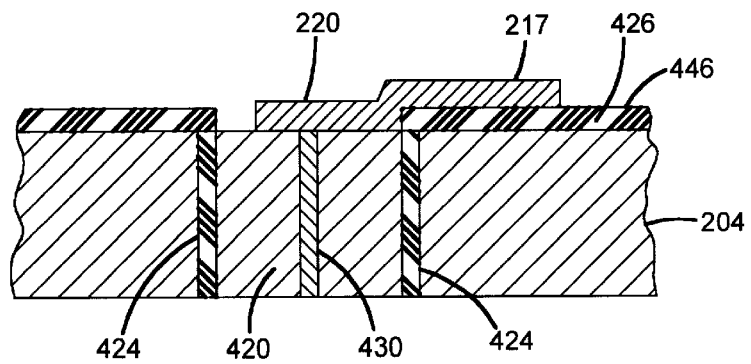

At FIGS. 11 and 12, a layer 446 of insulation material is deposited over the top surface 426 of wafer 400 in the regions outside isolation region 420 and the region 436 generally encompassing the length of beams 430 in what will be the space between the stator and rotor. Conductive pads 218 and 220, together with conductive traces 215 and 217, and pads 222, 224, 228 and 230, as well as coil 226 are also formed.

Figure 13:
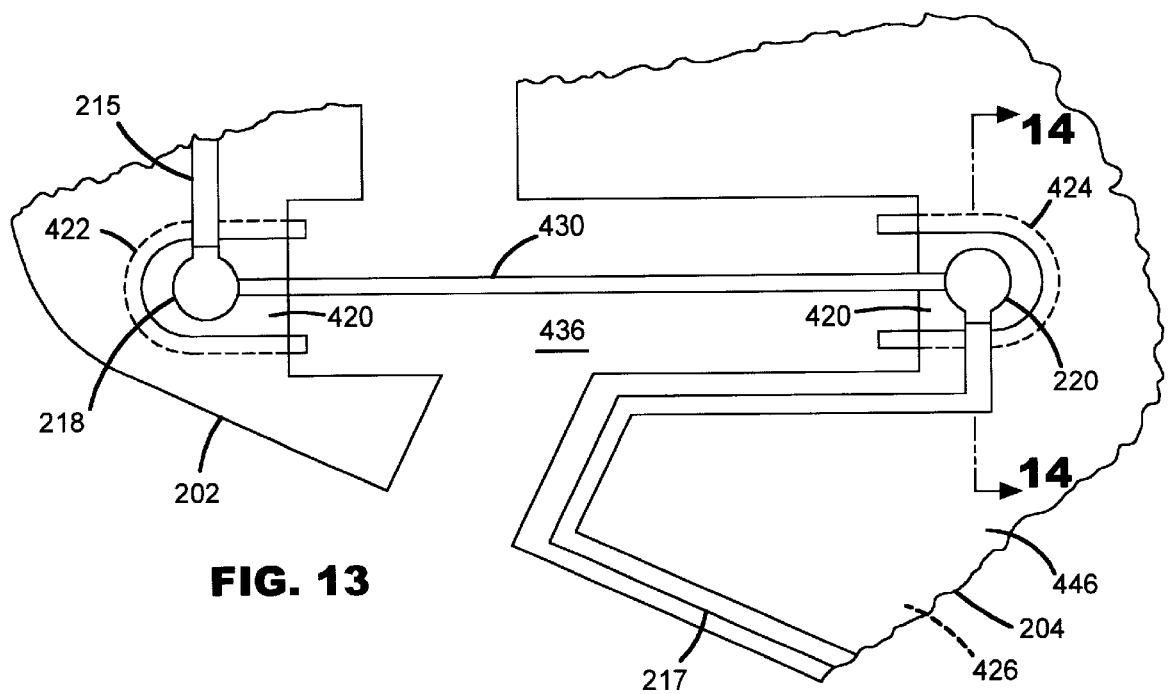
Figure 14:
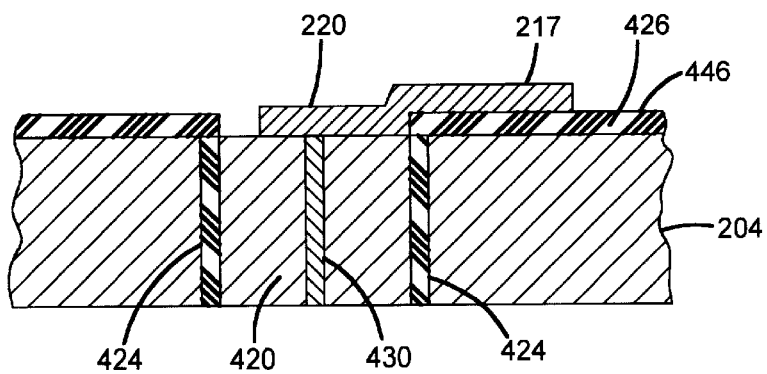

At FIGS. 13 and 14, wafer 400 is then selectively etched to remove portions of the wafer between lines 402 and 404 (FIG. 3), thereby separating the rotor and stator leaving the confronting surfaces 432 and 434 of stator and rotor regions 406 and 408, as well as elongated beam space 436. The etching process employs a mask patterned onto the stator and rotor regions so that the wafer is etched away to form space 436 and separate the stator and rotor. The ends 438 of legs 440 of isolation barriers 422 and 424 are exposed into space 436. In preferred embodiments, the mask is then removed.

Figure 15:
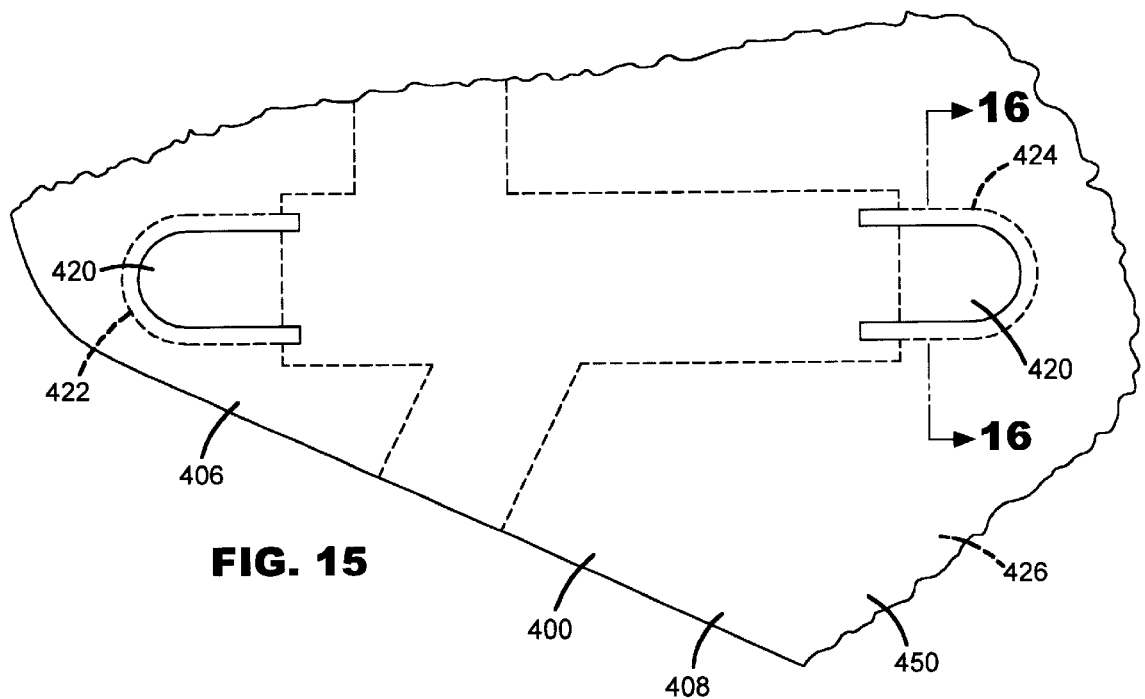
FIGS. 15–20 a process of forming a suspension beam according to a second embodiment of the present invention.
Figure 16:
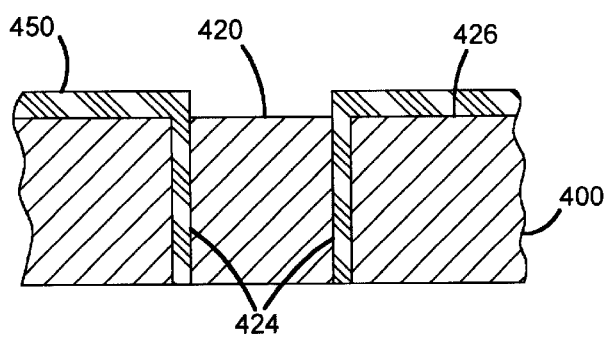
Figure 17:
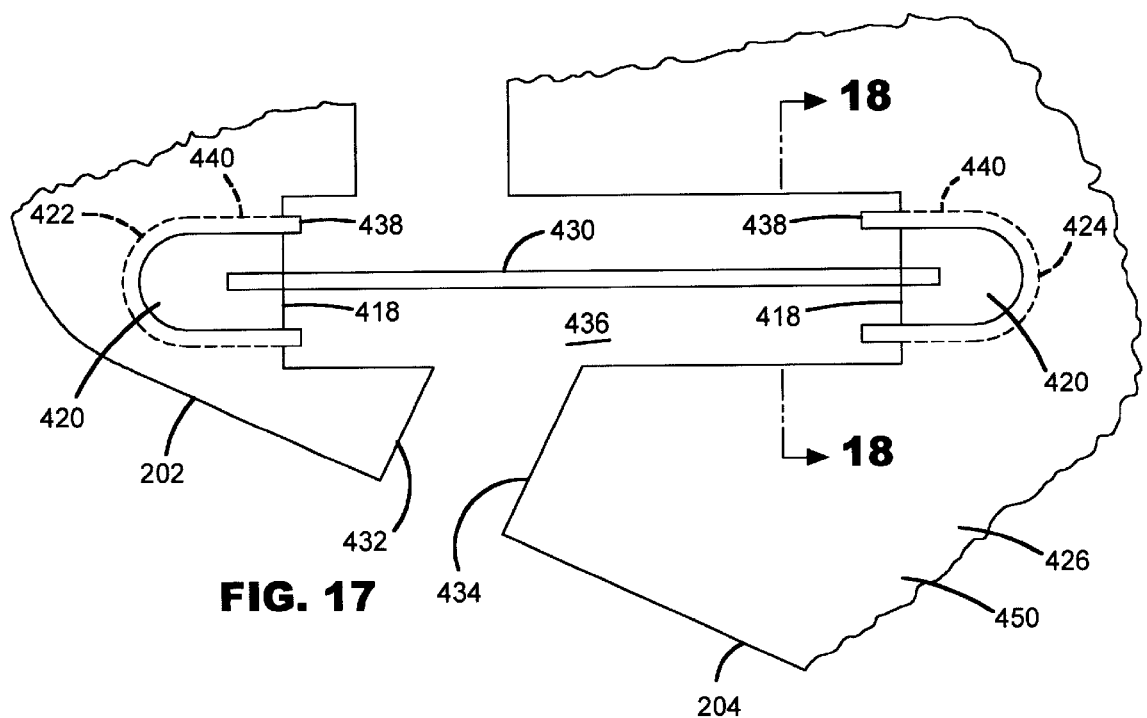
Figure 18:
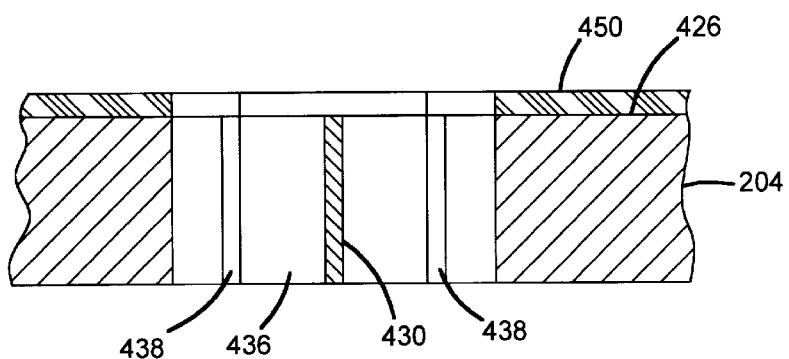
Figure 19:
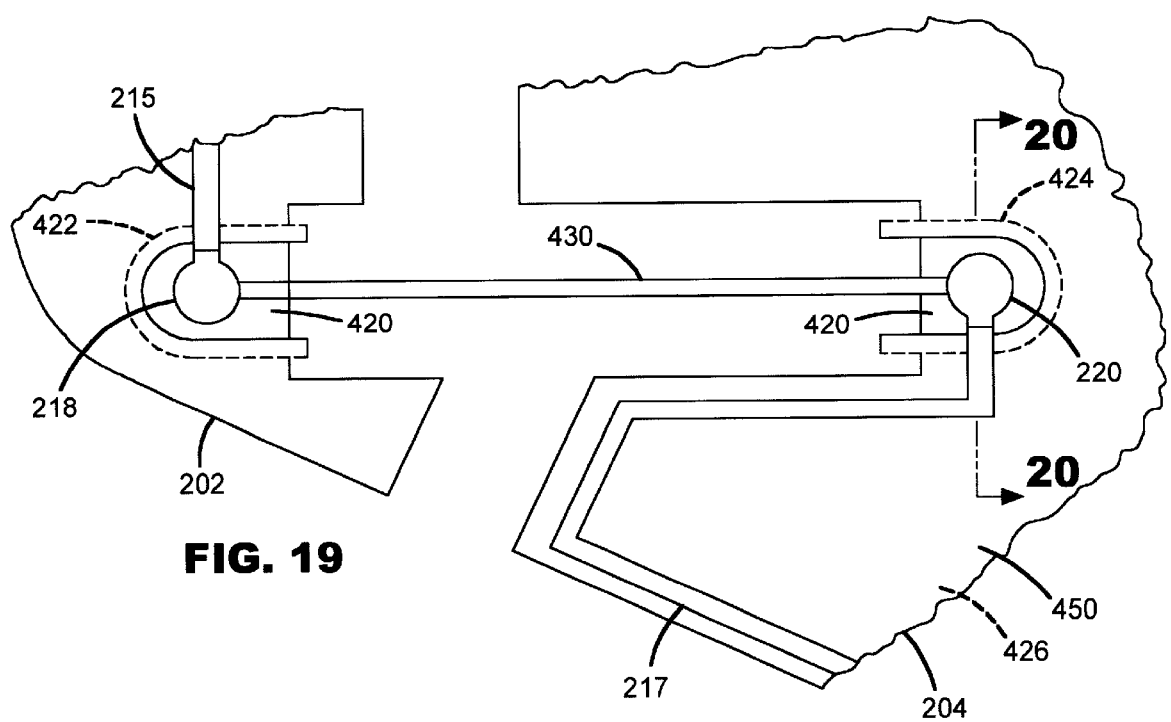
Figure 20:
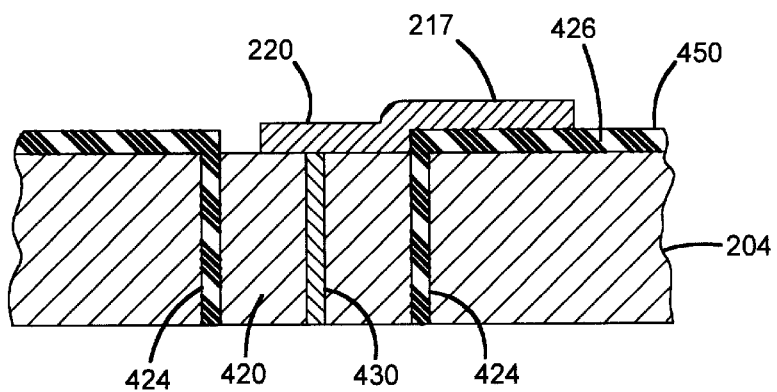

FIGS. 15–20 illustrate steps of a process according to another embodiment of the invention. In this case, instead of removing the layer of insulation material from surface 426 of wafer 400, as shown in FIGS. 5 and 6, the layer 450 of insulation material is allowed to remain in the region outside of isolation regions 420, as shown in FIGS. 15 and 16. Beam trench 428 is formed in wafer 400, filled with metal, and the stator and rotor are separated, substantially as described in connection with FIGS. 7–12. The result is the microactuator structure with insulation layer 450 on the top surface 426 of the stator and rotor outside isolation regions 420, as shown in FIGS. 17 and 18. Conductive pads 218 and 220 and printed circuit traces 215 and 217 are formed on beam 430 and insulation layer 450 as shown in FIGS. 19 and 20.

The principal advantage of the embodiment of FIGS. 15–20 is that the steps of removal of insulating layer 450 and re-deposit of insulating layer 444 are not necessary. Other modifications can be performed, including not completely removing the metal on the wafer surface remaining from deposition of beams 430, but instead to selectively etch that metal to a desired thickness and pattern for use as traces 215 and 217. This modification will eliminate the need for a separate metal deposition step to form the traces, as well as eliminate the need for the separate insulation deposition step to form layer 446.

Stated another way, one embodiment of the present invention is a process of forming a microactuator, such as microactuator 200. Stator and rotor regions 406 and 408 are defined on a wafer 400. A first isolation barrier, such as barrier 422, is formed in the wafer in stator region 406 to define a first isolation region, such as region 420, in the stator region. A second isolation barrier, such as barrier 424, is formed in the wafer in the rotor region 408 to define a second isolation region, such as region 420, in the rotor region. A conductive suspension beam, such as beam 430, is formed in the wafer between the first and second isolation regions. Wafer material is removed from between the stator and rotor regions to form a stator 202 and a rotor 204.

In some embodiments, the isolation barriers are formed by forming a first isolation trench, such as trench 410, through the wafer in the stator region 406 and forming a second isolation trench, such as trench 414, through the wafer in the rotor region 408. Insulation material is deposited in the first and second isolation trenches.

In some embodiments, the conductive beam is formed by forming a beam trench, such as trench 428, in the wafer between the first and second isolation regions, and depositing conductive material in the beam trench.

Another embodiment of the present invention is directed to a microactuator, such as microactuator 200, for positioning a load device, such as slider 110, having an electrical component, such as head 111. Microactuator 200 includes a stator 202, a rotor 204 supporting the load device, and suspension means, such as beams 208–213, coupled to the stator and rotor to support the rotor and load and provide electrical connection between the stator and rotor.

In some embodiments, the suspension means includes a plurality of beams 213–218, each beam having a first end supported in a first isolation region, such as region 420, on the stator 202 and having a second end supported in a second isolation region, such as region 420, on the rotor 204. An insulation layer, such as layer 446 or 450, is on the stator 202 and rotor 204 outside the respective first and second isolation regions. A plurality of first conductive traces, such as traces 215, are supported on the insulation layer on the stator 203 and are coupled to the first ends of at least some of the beams 213–218, and a plurality of second conductive traces, such as traces 217, are supported on the insulation layer on the rotor 204 and are coupled to the second ends of at least some of the beams 213–218.

Thus a metal suspension beam for a microactuator is electrically isolated from the stator and rotor to provide an electric signal path between the stator and the rotor, and provide structural support for the rotor and its load. Although the invention has been described with reference to coil-operated rotary microactuators, those skilled in the art will recognize that the present invention may be practiced with other system modifications, including but not limited to linear microactuators and to microactuators employing other driving mechanisms, such as piezoelectric microactuators. Moreover, while the invention has been described with reference to microactuators for fine positioning a slider in a disc drive, those skilled in the art will recognize that the invention may be practiced in other microactuator systems, including micropositioning devices such as switches, sensors, and the like.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the suspension beams while maintaining substantially the same functionality without departing from the scope and spirit of the present invention.

What is claimed is:

1. A microactuator for positioning a load device having an electrical component comprising:
   a stator;
   a rotor supporting the load device; and
   suspension means coupled to the stator and rotor to support the rotor and load and provide electrical connection between the stator and rotor.

2. The microactuator of claim 1, wherein the suspension means comprises:
   a plurality of beams, each beam having a first end supported in a first isolation region on the stator and having a second end supported in a second isolation region on the rotor,
   a first insulation layer on the stator outside the first isolation region and a second insulation layer on the rotor outside the second isolation region, and
   a plurality of first conductive traces supported on the first insulation layer and coupled to the first ends of at least some of the beams, and a plurality of second conductive traces supported on the second insulation layer and coupled to the second ends of at least some of the beams.

3. The microactuator of claim 2, wherein the first and second isolation regions include substantially C-shaped insulation barriers having legs that extend to respective confronting surfaces of the stator and rotor.

4. The microactuator of claim 2, wherein the beam has a width between about 5 and 10 $\mu$m.

5. The microactuator of claim 2, wherein the beam is formed of a material selected from the group consisting of tungsten, molybdenum, titanium, tantalum, copper, aluminum and alloys thereof.

6. The microactuator of claim 2, further including:
   a plurality of first conductive pads on the stator, at least some of the first conductive traces coupling respective ones of the first conductive pads to respective ones of the first ends of the beams.

7. The microactuator of claim 2, further including:
   a plurality of second conductive pads on the rotor, at least some of the second conductive traces coupling respective ones of the second conductive pads to respective ones of the second ends of the beams.

8. The microactuator of claim 7, wherein the microactuator further includes a slider supported by the rotor and a transducing head supported by the slider, at least some of the second conductive pads being electrically coupled to the transducing head.

9. The microactuator of claim 7, wherein the microactuator further includes:
   a coil supported by the rotor,
   at least some of the second conductive traces coupling the coil to respective ones of the second ends of the beams.

10. The microactuator of claim 2, including:
    a plurality of slots extending into confronting surfaces of the stator and rotor, each slot containing a respective one of the beams.

11. The microactuator of claim 10, wherein the first and second isolation regions include substantially C-shaped insulation barriers having legs that extend to respective ends of the slots.

12. An actuator arm assembly for positioning a transducer relative to a selected track on a recording medium in a data storage device to write data to and read data from the medium, the actuator arm assembly comprising:
    an actuator arm;
    a microactuator having a stator mounted to the actuator arm and a rotor supporting the transducer;
    a flex circuit supported by the actuator arm and electrically connected to the stator for carrying electric signals;
    a plurality of electrically conductive suspension beams each having a first end mounted to the stator and a second end mounted to the rotor, the suspension beams supporting the rotor and transducer relative to the stator;
    a plurality of first conductors electrically connecting the first ends of each suspension beam to the flex circuit; and
    a plurality of second electrical conductors electrically connected to the second ends of the suspension beams, at least some of the second electrical conductors electrically connecting the second ends of respective suspension beams to the transducer to supply write signals from the flex circuit to the transducer and to supply read signals from the transducer to the flex circuit.

13. The actuator assembly of claim 12, wherein the microactuator includes a coil supported by the rotor and at least some of the second electrical conductors electrically connect the second ends of respective suspension beams to the coil.

14. The actuator assembly of claim 12, including:
    a plurality of first isolation regions on the stator each supporting a first end of a respective beam, and
    a plurality of second isolation regions on the rotor each supporting a second end of a respective beam.

15. The actuator assembly of claim 14, wherein the first and second isolation regions include substantially C-shaped insulation barriers having legs that extend to respective confronting surfaces of the stator and rotor.

16. The actuator assembly of claim 12, wherein the beam has a width between about 5 and 10 $\mu$m.

17. The actuator assembly of claim 12, wherein the beam is formed of a material selected from the group consisting of tungsten, molybdenum, titanium, tantalum, copper, aluminum and alloys thereof.

18. The actuator assembly of claim 12, further including:
    a plurality of first conductive pads on the stator, at least some of the first conductive traces coupling respective ones of the first conductive pads to respective ones of the first ends of the beams.

19. The actuator assembly of claim 12, including:
    a plurality of slots extending into confronting surfaces of the stator and rotor, each slot containing a respective one of the beams.

20. The actuator assembly of claim 19, including:
a plurality of first isolation regions on the stator each supporting a first end of a respective beam, and
a plurality of second isolation regions on the rotor each supporting a second end of a respective beam.

21. The actuator assembly of claim 20, wherein the first and second isolation regions include substantially C-shaped insulation barriers having legs that extend to respective ends of the slots.

22. The actuator assembly of claim 12, further including:
a plurality of second conductive pads on the rotor, at least some of the second conductive traces coupling respective ones of the second conductive pads to respective ones of the second ends of the beams.

23. The actuator assembly of claim 22, further including a slider supported by the rotor, the transducer being supported by the slider, at least some of the second conductive pads being electrically coupled to the transducer.

24. The actuator assembly of claim 23, including:
a plurality of first isolation regions on the stator each supporting a first end of a respective beam, and
a plurality of second isolation regions on the rotor each supporting a second end of a respective beam.

25. The actuator assembly of claim 24, wherein the first and second isolation regions include substantially C-shaped insulation barriers having legs that extend to respective confronting surfaces of the stator and rotor.

26. The actuator assembly of claim 23, wherein the beam has a width between about 5 and 10 $\mu$m.

27. The actuator assembly of claim 23, wherein the beam is formed of a material selected from the group consisting of tungsten, molybdenum, titanium, tantalum, copper, aluminum and alloys thereof.

28. The actuator assembly of claim 23, further including:
a plurality of first conductive pads on the stator, at least some of the first conductive traces coupling respective ones of the first conductive pads to respective ones of the first ends of the beams.

29. The actuator assembly of claim 23, including:
a plurality of slots extending into confronting surfaces of the stator and rotor, each slot containing a respective one of the beams.

* * * * *